United States Patent
Booz et al.

(10) Patent No.: US 11,073,324 B2
(45) Date of Patent: *Jul. 27, 2021

(54) DRAIN PAN REMOVABLE WITHOUT THE USE OF TOOLS

(71) Applicant: Johnson Controls Technology Company, Auburn Hills, MI (US)

(72) Inventors: Neil D. Booz, Gulfport, FL (US); Angus B. Latham, St. Petersburg, FL (US); Beau G. Brooks, Pinellas Park, FL (US)

(73) Assignee: Air Distribution Technologies IP, LLC, Milwaukee, WI (US)

( * ) Notice: Subject to any disclaimer, the term of this patent is extended or adjusted under 35 U.S.C. 154(b) by 174 days.

This patent is subject to a terminal disclaimer.

(21) Appl. No.: 16/185,937

(22) Filed: Nov. 9, 2018

(65) Prior Publication Data

US 2019/0078831 A1    Mar. 14, 2019

Related U.S. Application Data

(63) Continuation of application No. 15/202,361, filed on Jul. 5, 2016, now Pat. No. 10,132,553.

(51) Int. Cl.
*F25D 21/14*     (2006.01)
*F24F 13/22*     (2006.01)
*F16N 31/00*     (2006.01)

(52) U.S. Cl.
CPC ............ *F25D 21/14* (2013.01); *F24F 13/222* (2013.01); *F16N 31/00* (2013.01); *F16N 31/002* (2013.01);

(Continued)

(58) Field of Classification Search
CPC ............... F25D 21/14; F25D 2321/144; F25D 2321/1441; F25D 2321/1442;
(Continued)

(56) References Cited

U.S. PATENT DOCUMENTS 1,684,558 A * 9/1928 Schwarz ................. F25D 21/14
                                                                62/288
1,899,852 A * 2/1933 Chadwick ............... F25D 21/14
                                                                62/131

(Continued)

FOREIGN PATENT DOCUMENTS

JP      S54-41562       4/1979
KR   2015-0030879       3/2015
(Continued)

OTHER PUBLICATIONS

The invitation to pay additional fees and, where applicable, protest fee mailed by European Patent Office dated Jul. 25, 2016 for PCT patent application No. PCT/US2016/028123.

(Continued)

*Primary Examiner* — James N Smalley
*Assistant Examiner* — Jennifer Castriotta
(74) *Attorney, Agent, or Firm* — Fletcher Yoder, P.C.

(57) ABSTRACT

A drainage system comprising a first bracket having a horizontal structure and one or more vertical structures, a second bracket having a horizontal structure and one or more vertical structures and a drain pan having a plurality of locking mechanisms, each configured to interlock with one of the vertical structures of the first bracket or the second bracket.

24 Claims, 3 Drawing Sheets

(52) U.S. Cl.
CPC ...... *F16N 31/006* (2013.01); *F25D 2321/143* (2013.01); *F25D 2321/144* (2013.01)

(58) Field of Classification Search
CPC .. F25D 2321/143; F16N 31/00; F16N 31/002; F16N 31/006; F16N 31/004
USPC .... 220/571, 571.1, 572, 573, 752, 756, 759, 220/760, 767, 768, 769, 772, 773, 775, 220/776
See application file for complete search history.

(56) References Cited

U.S. PATENT DOCUMENTS

| | | | | |
|---|---|---|---|---|
| 2,215,665 | A * | 9/1940 | Hedlund | F25D 21/14 62/286 |
| 3,812,617 | A | 5/1974 | Brody | |
| 3,927,812 | A * | 12/1975 | Winters | B65D 25/2873 220/759 |
| 4,417,687 | A | 11/1983 | Grant | |
| 4,783,971 | A * | 11/1988 | Alba | F25D 21/14 248/225.11 |
| 4,854,075 | A * | 8/1989 | Greiling | A01G 9/0295 47/73 |
| 5,251,815 | A | 10/1993 | Foye | |
| 5,452,739 | A * | 9/1995 | Mustee | A47L 15/4212 137/312 |
| 6,112,536 | A * | 9/2000 | Hansen | F25D 21/14 62/285 |
| 6,363,736 | B1 | 4/2002 | Kunkel et al. | |
| 6,431,127 | B2 | 8/2002 | Weber | |
| 7,667,376 | B2 | 2/2010 | Schmidt | |
| 7,692,411 | B2 | 4/2010 | Trainor et al. | |
| 7,781,943 | B1 | 8/2010 | Hamel et al. | |
| 7,830,072 | B2 | 11/2010 | Schmidt | |
| 7,864,507 | B2 | 1/2011 | Fleig et al. | |
| 7,884,727 | B2 | 2/2011 | Tran | |
| 7,982,439 | B2 | 7/2011 | Trainor et al. | |
| 8,086,352 | B1 | 12/2011 | Elliott | |
| 8,228,151 | B2 | 7/2012 | Schmidt | |
| 8,249,731 | B2 | 8/2012 | Tran et al. | |
| 8,350,519 | B2 | 1/2013 | Brantner et al. | |
| 8,531,047 | B2 | 9/2013 | Schmidt et al. | |
| 8,621,245 | B2 | 12/2013 | Sgearer et al. | |
| 9,197,143 | B1 | 11/2015 | Townsend et al. | |
| 2001/0025610 | A1 | 10/2001 | Weber | |
| 2004/0159713 | A1 | 8/2004 | Schmidt et al. | |
| 2005/0040782 | A1 | 2/2005 | Jasinski et al. | |
| 2005/0087616 | A1 | 4/2005 | Attridge | |
| 2005/0144963 | A1 | 7/2005 | Peterson et al. | |
| 2005/0258259 | A1 | 11/2005 | Stanimirovic | |
| 2005/0270151 | A1 | 12/2005 | Winick | |
| 2005/0278069 | A1 | 12/2005 | Bash et al. | |
| 2006/0281435 | A1 | 12/2006 | Shearer et al. | |
| 2007/0182362 | A1 | 8/2007 | Trainor et al. | |
| 2008/0083446 | A1 | 4/2008 | Chakraborty et al. | |
| 2009/0102296 | A1 | 4/2009 | Greene et al. | |
| 2009/0168305 | A1 | 7/2009 | Fleig et al. | |
| 2009/0251099 | A1 | 10/2009 | Brantner et al. | |
| 2009/0260284 | A1 * | 10/2009 | Barbalho | A01G 9/033 47/65.9 |
| 2010/0060231 | A1 | 3/2010 | Trainor et al. | |
| 2010/0090656 | A1 | 4/2010 | Shearer et al. | |
| 2010/0139306 | A1 | 6/2010 | Krenik | |
| 2010/0175319 | A1 * | 7/2010 | Meeks | B65D 19/06 47/79 |
| 2010/0277270 | A1 | 11/2010 | Aikens et al. | |
| 2010/0315046 | A1 | 12/2010 | Trainor et al. | |
| 2011/0034120 | A1 | 2/2011 | Jaiyeola | |
| 2011/0077758 | A1 | 3/2011 | Tran et al. | |
| 2011/0109102 | A1 | 5/2011 | McCoy et al. | |
| 2011/0115222 | A1 | 5/2011 | Parker et al. | |
| 2011/0158806 | A1 | 6/2011 | Arms et al. | |
| 2011/0172828 | A1 | 7/2011 | Schmidt et al. | |
| 2011/0208450 | A1 | 8/2011 | Salka et al. | |
| 2012/0068669 | A1 | 3/2012 | Trainor et al. | |
| 2012/0072030 | A1 | 3/2012 | Elliott | |
| 2012/0256492 | A1 | 10/2012 | Song et al. | |
| 2012/0085774 | A1 | 12/2012 | Luburic | |
| 2013/0013120 | A1 | 1/2013 | Sabripour | |
| 2013/0024029 | A1 | 1/2013 | Tran et al. | |
| 2013/0181689 | A1 | 7/2013 | Ocalan | |
| 2013/0201316 | A1 | 8/2013 | Binder et al. | |
| 2013/0206784 | A1 * | 8/2013 | Short | B65D 25/2873 220/760 |
| 2013/0217294 | A1 | 8/2013 | Karunaratne | |
| 2013/0318871 | A1 * | 12/2013 | Street | A01G 9/02 47/65.7 |
| 2013/0328416 | A1 | 12/2013 | Whitworth et al. | |
| 2014/0111032 | A1 | 4/2014 | Shearer et al. | |
| 2014/0222216 | A1 | 8/2014 | Chen | |
| 2014/0330438 | A1 | 11/2014 | Haines et al. | |
| 2016/0007525 | A1 | 1/2016 | Drew et al. | |

FOREIGN PATENT DOCUMENTS

| | | |
|---|---|---|
| RU | 2538514 | 1/2015 |
| WO | 2014/018304 | 1/2014 |

OTHER PUBLICATIONS

The International Search Report and Written Opinion issued by European Patent Office dated Oct. 25, 2016 for PCT patent application No. PCT/US2016/028123.

* cited by examiner

DRAIN PAN REMOVABLE WITHOUT THE USE OF TOOLS

CROSS REFERENCE TO RELATED APPLICATION

This application is a continuation of U.S. patent application Ser. No. 15/202,361, entitled "DRAIN PAN REMOVABLE WITHOUT THE USE OF TOOLS," filed Jul. 5, 2016, which is hereby incorporated by reference in its entirety for all purposes.

TECHNICAL FIELD

The present disclosure relates generally to drainage systems for equipment, and more specifically to a drain pan that can be readily installed on equipment without the use of tools, using two or more brackets that are adapted to be easily attached to common surfaces.

BACKGROUND OF THE INVENTION

Condensate drain pans are used to collect condensate, but are typically installed with connectors that require machine tools to attach. The space around the condensate drain pans is typically crowded with other equipment that makes using machine tools difficult or impossible.

SUMMARY OF THE INVENTION

A drainage system is disclosed that includes a first bracket having a horizontal structure, such as a flat surface, and one or more vertical structures, such as legs. A second bracket also has a horizontal structure, such as a flat surface, and one or more vertical structures, such as legs. A drain pan has locking mechanisms that correspond to the legs of the brackets, which interlock with one of the legs of the first bracket or the second bracket.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
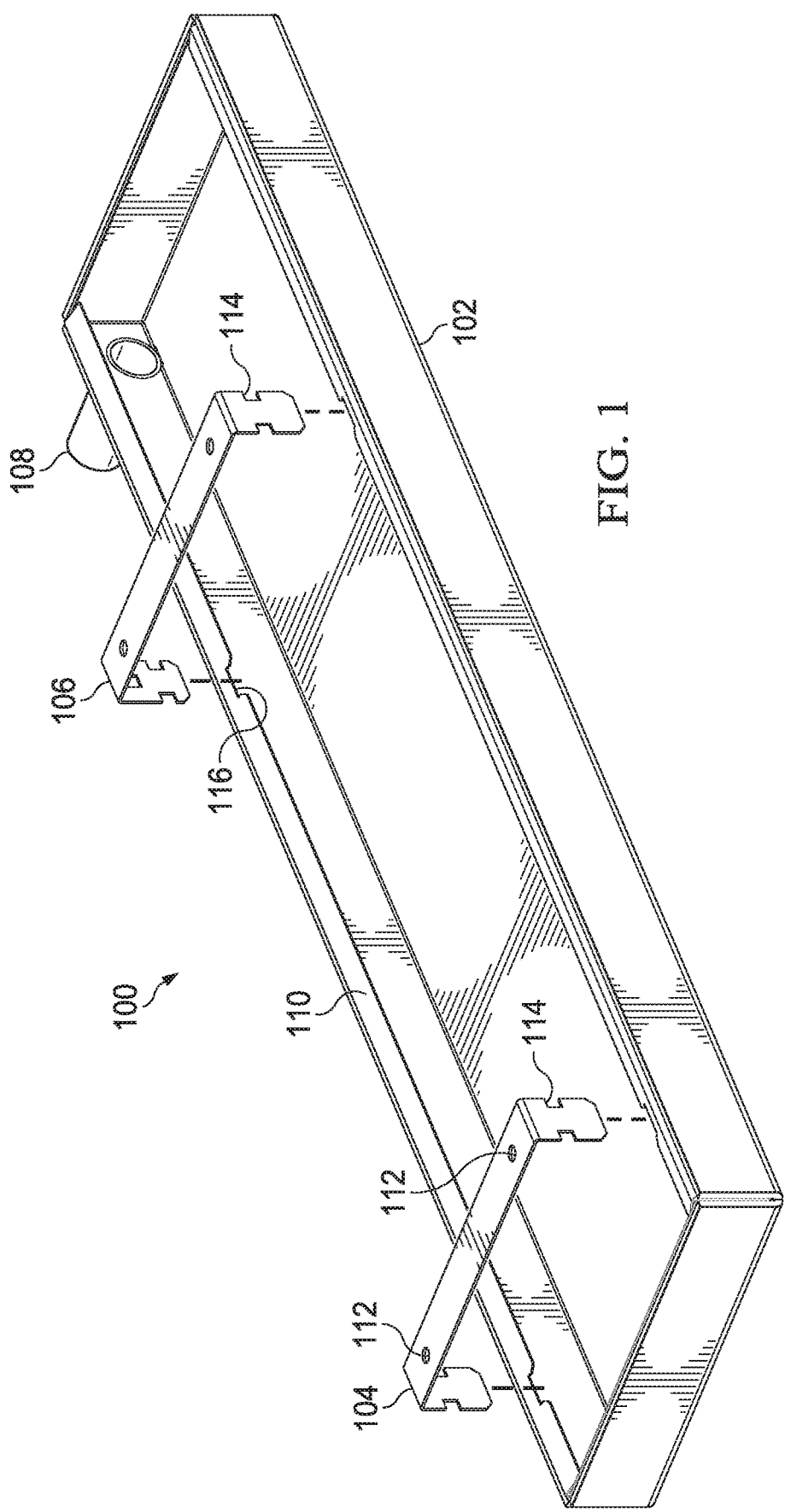
FIG. 1 is a diagram of a tool-less and removable condensate drain pan in accordance with an exemplary embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

Fan coil units for cooling systems use a fan to force air past metal coils, which are used to hold expanding pressurized gas in what is commonly called an "evaporator" coil. As the gas expands, it absorbs heat from the metal coils, which results in the temperature of the metal coils being reduced. The air that is forced past the metal coils is also subsequently cooled as heat from the air is transferred to the metal coils, which results in a lowered dew point of the air and condensation of water vapor from the air on the coils. Any particulate matter in the air can also be deposited on the surface of the evaporator coils with the condensate, such that the metal coils will require periodic maintenance. This maintenance includes cleaning and possibly replacing the condensate drain pan, if needed due to fouling or accumulation of particulate matter. The present disclosure provides a mechanism to allow the drain pan to be removed without the need for a power tool or hand tool. The present disclosure can also or alternatively be used for water coils, steam coils or any other coils that can leak, such as for leak protection.

Condensate drain pans used in the prior art typically require a power tool or hand tool to install or remove, or complex bracket designs that are incorporated with the cooling coil supports. These prior art condensate drain pans create issues because access to the drain pans may be limited and severely inhibit tool access, or the complex brackets may not be compatible with an existing design for cooling coils. In contrast, the present disclosure provides a condensate drain pan that has an attachment mechanism that can be secured to a suitable surface of the associated cooling system, to allow the condensate drain pan to be attached to the unit at a location where the cooling coils are directly above the pan.

The tool-less removable condensate drain pan of the present disclosure can be used in a cooling system such as with heating, ventilation and air conditions ("HVAC") equipment that utilizes a condensate drain pan to drain condensate from a hydronic or direct expansion cooling coil. The disclosed tool-less drain pan can be sloped in two planes to provide a gravity-fed condensate collection to a main drain line, so as to comply with ASHRAE 62 IAQ requirements.

The disclosed drain pan can be removed without the use of a service tool, such as a screw driver, hex nut driver, hex head wrench, socket wrench or other service tools. The mounting brackets and condensate drain pan mounting interface provide a slope to the drain pan in two planes, to cause any condensate to flow to the drain pan's main drain line using only the force of gravity. Because the disclosed drain pan and support brackets can be readily adapted to existing designs, they can be used for units with internal or external drain pans.

FIG. 1 is a diagram of a tool-less and removable condensate drain pan 100, in accordance with an exemplary embodiment of the present disclosure. Drain pan 100 includes drain pan body 102, which can be formed from injection molded plastic, sheet metal or other suitable materials. Support brackets 104 and 106 are used to hold drain pan body 102, and are configured as described in greater detail herein to interface with and drain pan body 102, and securely hold drain pan body 102 in position during use. Drain pipe 108 can be used to drain condensate from drain pan body 102, can couple to a drain line (not explicitly shown) or can otherwise be used to control condensate disposal.

Support brackets 104 and 106 each include two vertical supports and a horizontal support with mounting holes 112, which are used in conjunction with a bolt, screw, rivet or other suitable attachment devices to attach support brackets 104 and 106 to a suitable surface. In one exemplary embodiment, support brackets 104 and 106 can be attached to the external underside structural surface of an evaporator coil support, such as by using mounting holes and an associated attachment device, by welding, epoxy or in other suitable manners. In another exemplary embodiment, support brackets 104 and 106 can be attached to an internal surface of a device that includes evaporator cooling coils, such as HVAC units, refrigerator units, ice makers or other suitable devices. Support brackets 104 and 106 also have two mechanical locking interfaces 114 that interlock with a corresponding mechanical locking interface 116 on an upper surface 110 or lip of the drain pan body 102, such that drain pan body includes four mechanical locking interfaces 116. These mechanical locking interfaces are described in greater detail below.

In one exemplary embodiment, drain pan body 102 can be configured to have an incline towards condensate drain 108, such as by having an incline from support bracket 104 towards support bracket 106, an incline from the side opposite condensate drain 108 towards the side on which condensate drain 108 is installed, or in other suitable manners. In another exemplary embodiment, support brackets 104 and 106 can be configured to provide an incline to drain pan body 102 towards condensate drain 108, such as by providing support bracket 104 with shorter vertical supports than support bracket 106, by providing vertical supports that are shorter on the side opposite condensate drain 108 or in other suitable manners.

Figure 2:
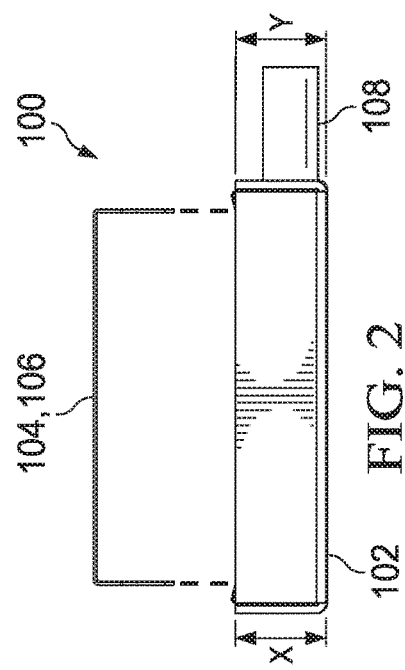
FIG. 2 is a side view of a tool-less and removable condensate drain pan in accordance with an exemplary embodiment of the present disclosure.

FIG. 2 is a side view of a tool-less and removable condensate drain pan 100 in accordance with an exemplary embodiment of the present disclosure. As shown in FIG. 2, drain pan body 102 can have a depth "X" along the side opposite from condensate drain 108 and a depth "Y" along the side on which condensate drain 108 is attached, where X is less than Y, so as to create an incline in the direction of condensate drain 108.

Figure 3:
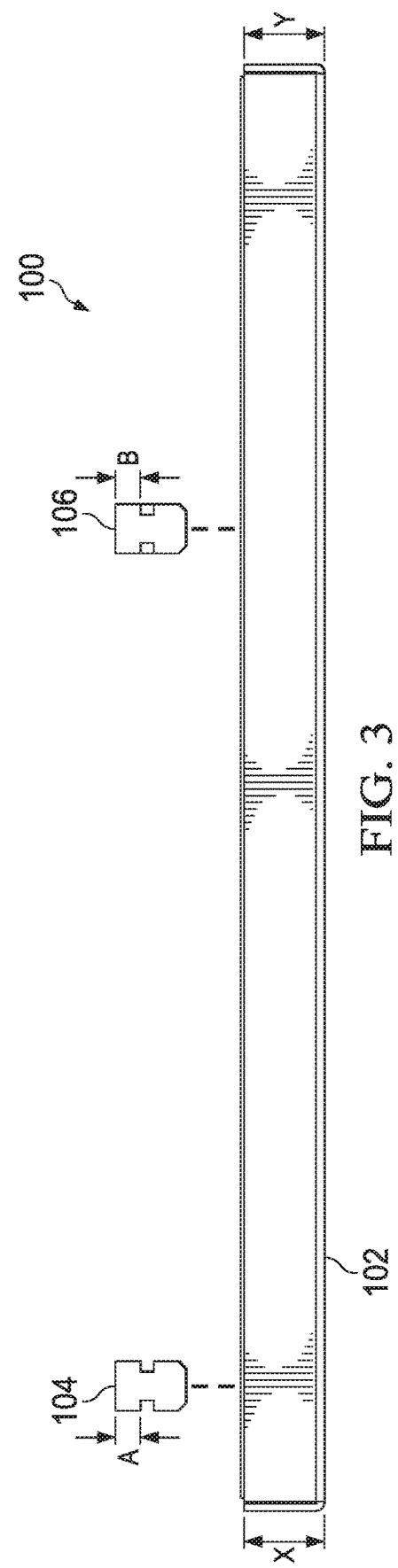
FIG. 3 is a front view of a tool-less and removable condensate drain pan in accordance with an exemplary embodiment of the present disclosure.

FIG. 3 is a front view of a tool-less and removable condensate drain pan in accordance with an exemplary embodiment of the present disclosure. As shown in FIG. 3, drain pan body 102 can have a depth "X" along the end opposite from condensate drain 108 and a depth "Y" along the end on which condensate drain 108 is attached, where X is less than Y, so as to create an incline in the direction of condensate drain 108. Also shown in FIG. 3 is dimension A, which is the distance between the top of support bracket 104 and mechanical locking interface 114 that interfaces with the corresponding mechanical locking interface 116 of drain pan body 102, and the corresponding dimension B, which is the distance between the top of support bracket 106 and the corresponding mechanical locking interface 116 of drain pan body 102 for that side of support bracket 106.

Figure 4:
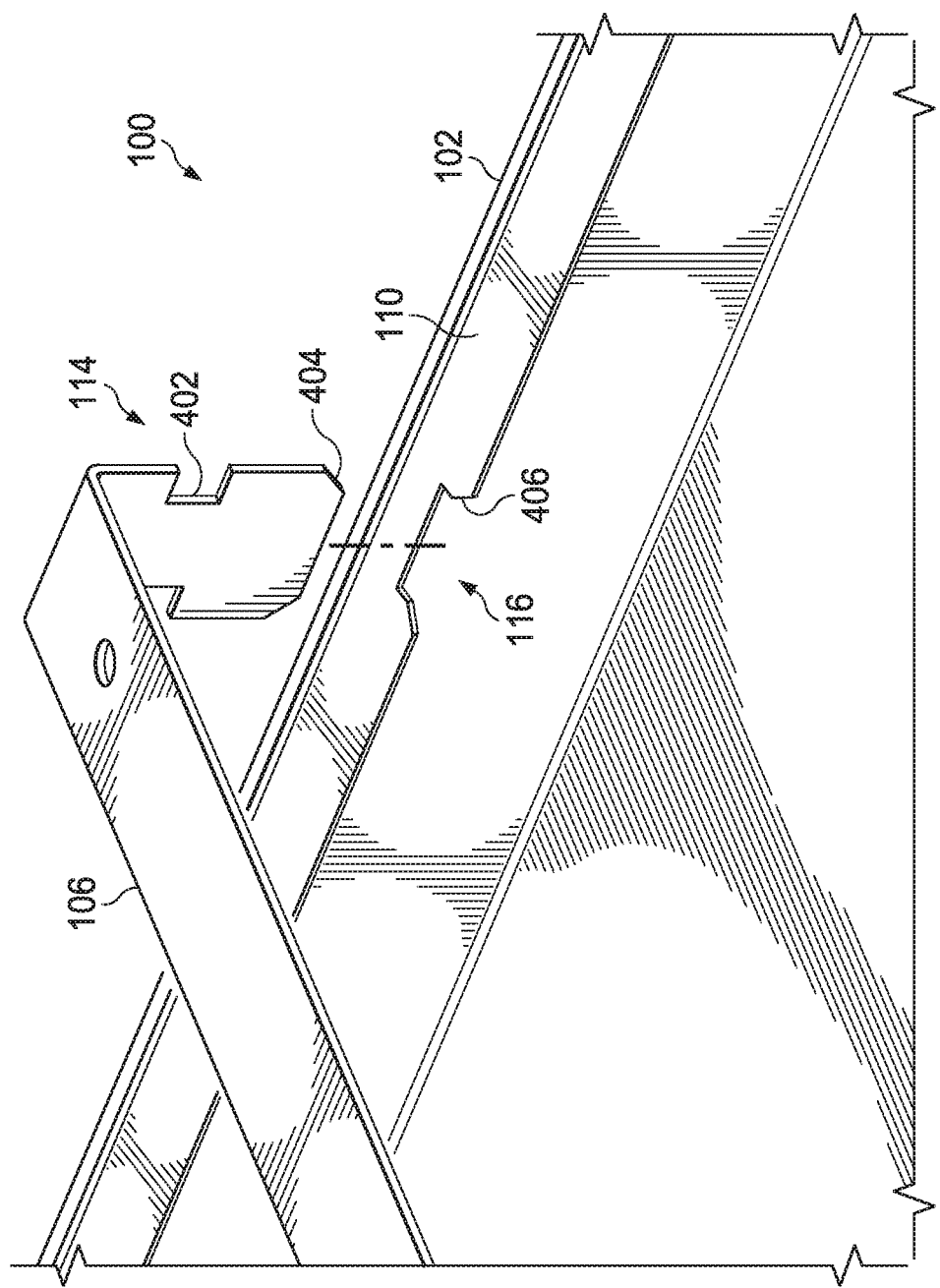
FIG. 4 is a detail showing a connection point between a support bracket and a tool-less and removable condensate drain pan in accordance with an exemplary embodiment of the present disclosure.

FIG. 4 is a detail showing a connection point between a support bracket and a tool-less and removable condensate drain pan 100 in accordance with an exemplary embodiment of the present disclosure. Mechanical locking interface 114 is formed in this exemplary embodiment by cutting, machining or otherwise suitably forming a rectangular notch 402 in either side along the vertical leg of support bracket 106, which locks with a corresponding mechanical locking interface 116 of drain pan body 102, and which can be formed by cutting, machining or otherwise forming a rectangular notch 406 into an upper edge of the upper surface 110 of drain pan body 102. In addition, an angular leading edge 404 can be formed at the end of the vertical leg of support bracket 106, to aid in guiding the vertical leg into rectangular notch 406.

As previously discussed, the location of rectangular notch 402 along the length of the vertical leg of support bracket 106 (or support bracket 104) can be varied, so as to create an incline in the bottom surface of drain pan body 102, to aid in causing condensate to flow to condensate drain 108. Likewise, the locations of rectangular notches 402 at other locations of support brackets 104 and 106 can be coordinated to facilitate in creating the desired incline for drain pan body 102.

Although a specific mechanical interlocking interface has been shown, other suitable mechanical interlocking interfaces can also or alternatively be used. For example, latches, male and female plugs, snap joints, claps, clips, slides, magnetic latches or other suitable devices can be used to connect the vertical legs of support brackets 104 and 106 (or other suitable supports) to drain pan body 102 or other suitable structures, so as to provide a reliable and solid connection between the support brackets 104 and 106 and drain pan body 102, or other suitable structures.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A drainage system, comprising:
   a first bracket having a first horizontal structure and first vertical structures, wherein the first vertical structures include a first plurality of locking mechanisms;
   a second bracket having a second horizontal structure and second vertical structures, wherein the second vertical structures include a second plurality of locking mechanisms; and a drain pan having a plurality of corresponding locking mechanisms, wherein each corresponding locking mechanism of the plurality of corresponding locking mechanisms is configured to interlock with one locking mechanism of the first plurality of locking mechanisms or with one locking mechanism of the second plurality of locking mechanisms to create an incline in a bottom surface of the drain pan, and wherein the drain pan is configured to direct condensate captured within the drain pan to flow toward a condensate drain.

2. The drainage system of claim 1, wherein a locking mechanism of the first plurality of locking mechanisms is a notch, and wherein a corresponding locking mechanism of the plurality of corresponding locking mechanisms is a corresponding notch configured to interlock with the notch.

3. The drainage system of claim 2, wherein the notch is a first rectangular notch and the corresponding notch is a second rectangular notch.

4. The drainage system of claim 1, wherein a first locking mechanism of the first plurality of locking mechanisms is spaced a first distance along the first vertical structures from the first horizontal structure, wherein a second locking mechanism of the second plurality of locking mechanisms is spaced a second distance along the second vertical structures from the second horizontal structure, and wherein the first distance is different than the second distance.

5. The drainage system of claim 1, wherein each locking mechanism of the first plurality of locking mechanisms is spaced a respective distance from the first horizontal structure.

6. The drainage system of claim 1, wherein the incline includes a first slope in a first plane and a second slope in a second plane, and wherein the second plane intersects the first plane.

7. The drainage system of claim 6, comprising the condensate drain, wherein the condensate drain is formed in a corner portion of the drain pan.

8. The drainage system of claim 1, wherein the drain pan is configured to have the incline in the bottom surface after installation of the drainage system within a cooling system to create a gravity feed to direct the captured condensate toward the condensate drain.

9. The drainage system of claim 1, wherein the drainage system is configured to be installed below an evaporator coil.

10. The drainage system of claim 1, wherein the plurality of corresponding locking mechanisms is configured to be unlocked from the first plurality of locking mechanisms or the second plurality of locking mechanisms without use of a service tool.

11. A drainage system, comprising:
a first bracket having a first horizontal structure and first vertical structures, wherein the first vertical structures include a plurality of first notches;
a second bracket having a second horizontal structure and second vertical structures, wherein the second vertical structures include a plurality of second notches; and
a drain pan having a plurality of locking mechanisms, each locking mechanism of the plurality of locking mechanisms being configured to interlock with one first notch of the plurality of first notches or with one second notch of the plurality of second notches, wherein the plurality of first notches and the plurality of second notches are configured to create an incline in a bottom surface of the drain pan in an installed configuration, and wherein the drain pan is configured to direct a flow of collected condensate toward a condensate drain formed in the drain pan.

12. The drainage system of claim 11, wherein the incline is angled in both a first plane and a second plane, wherein the first plane intersects the second plane.

13. The drainage system of claim 11, wherein the condensate drain is formed in a first side of the drain pan, and wherein the first vertical structures and the second vertical structures are longer on the first side of the drain pan than on a second side of the drain pan, opposite the first side.

14. The drainage system of claim 11, wherein the condensate drain is formed in a first side of the drain pan, and wherein the drain pan has a greater depth along the first side than on a second side of the drain pan, opposite the first side.

15. The drainage system of claim 11, wherein the drain pan includes:
a plurality of walls extending from a perimeter of the bottom surface of the drain pan; and
a lip extending from an edge of the plurality of walls opposite from the bottom surface, wherein the plurality of locking mechanisms is a plurality of third notches formed in the lip.

16. The drainage system of claim 11, wherein the plurality of locking mechanisms include:
a first notch on a first side of the drain pan; and
a second notch on a second side of the drain pan, opposite the first side.

17. A drainage system, comprising:
a first bracket having a first horizontal structure and one or more first vertical structures, each first vertical structure having a first locking mechanism;
a second bracket having a second horizontal structure and one or more second vertical structures, each second vertical structure having a second locking mechanism; and
a drain pan having a plurality of third locking mechanisms, each third locking mechanism configured to interlock with the first locking mechanism or with the second locking mechanism, wherein the first locking mechanism and the second locking mechanism are configured to create an incline in a bottom surface of the drain pan after installation of the drainage system, and wherein the drain pan is configured to direct condensate captured within the drain pan to flow toward a condensate drain.

18. The drainage system of claim 17, wherein the first locking mechanism and the second locking mechanisms each comprise a notch.

19. The drainage system of claim 17, wherein the first locking mechanism is a complementary slot locking mechanism corresponding to a respective one of the plurality of third locking mechanisms of the drain pan.

20. The drainage system of claim 17, wherein each of the first locking mechanism and the second locking mechanism is a latch, a plug, a snap joint, a clap, a clip, or a slide.

21. The drainage system of claim 17, wherein the drain pan includes a first wall extending from a first edge of the bottom surface and a second wall extending from a second edge of the bottom surface, and wherein the bottom surface extends substantially linearly between the first wall and the second wall.

22. The drainage system of claim 17, wherein the bottom surface is configured to have the incline relative to the first horizontal structure.

23. The drainage system of claim 17, wherein the first horizontal structure is a flat surface having a plurality of mounting holes.

24. The drainage system of claim 23, comprising:
 a support structure; and
 a plurality of mechanical connectors configured to couple the support structure to the first horizontal structure through the plurality of mounting holes.

\* \* \* \* \*